C. H. LOGUE AND D. D. ORMSBY.
DIFFERENTIAL GEARING.
APPLICATION FILED OCT. 25, 1917.
1,396,225.
Patented Nov. 8, 1921.
3 SHEETS—SHEET 1.
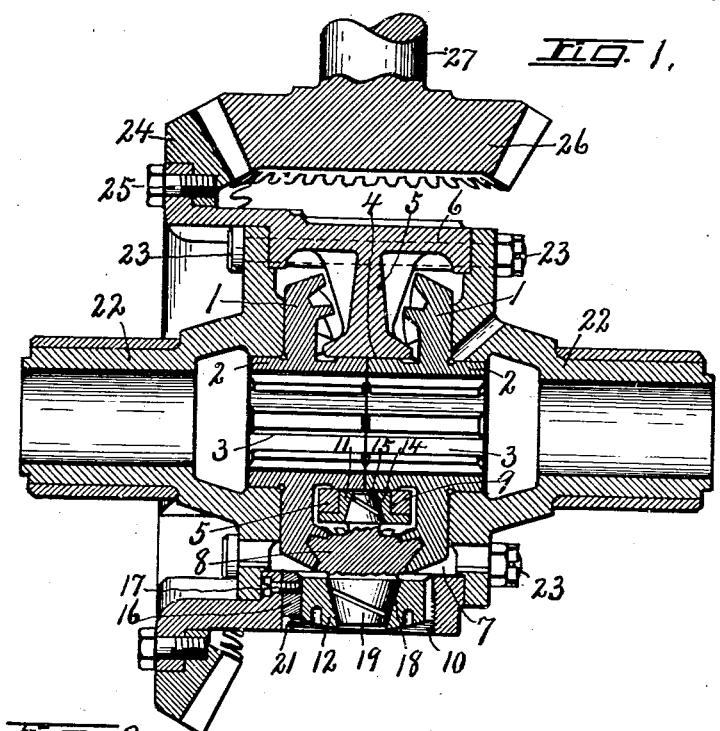
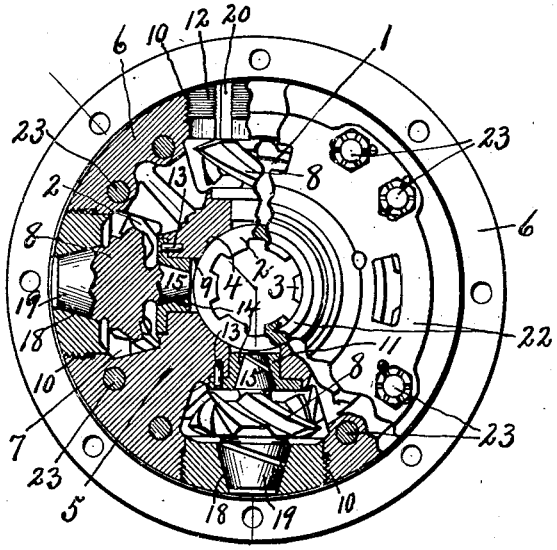
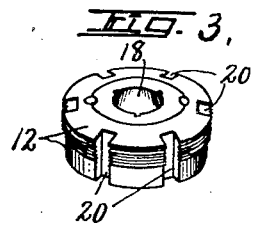
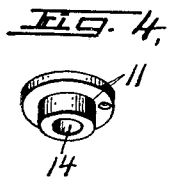

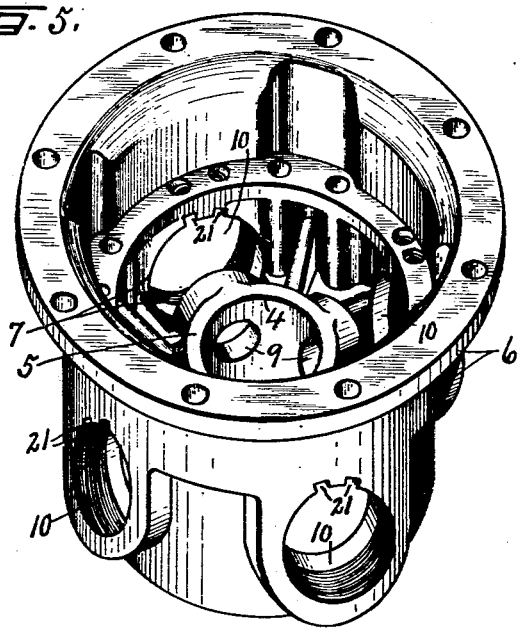
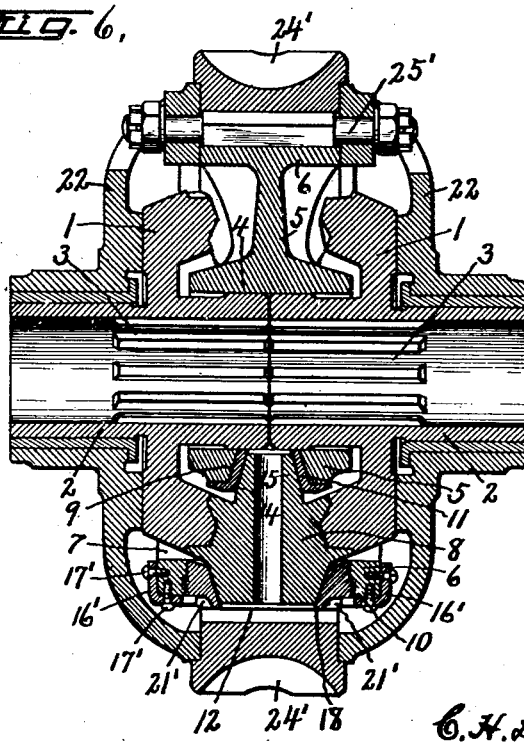

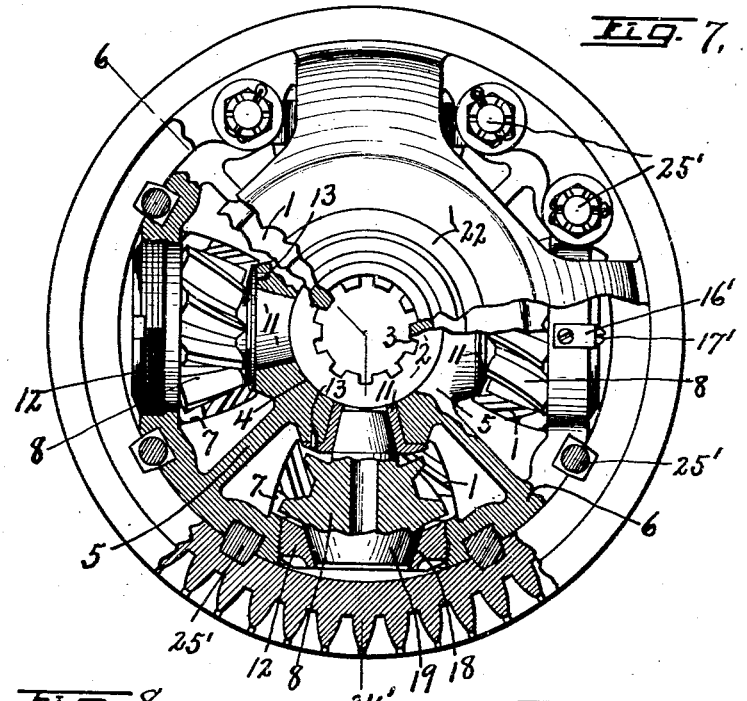
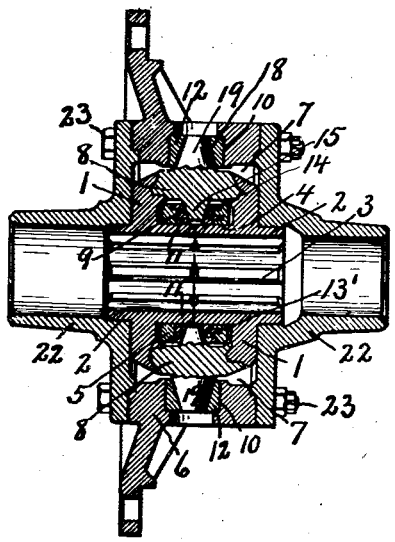
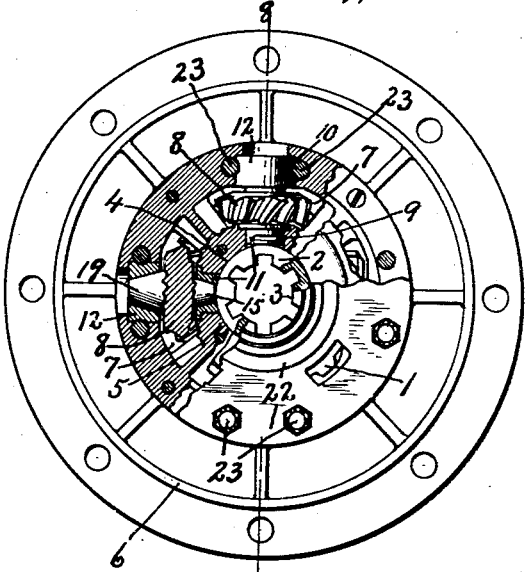

UNITED STATES PATENT OFFICE.

CHARLES H. LOGUE AND DONALD D. ORMSBY, OF SYRACUSE, NEW YORK.

DIFFERENTIAL GEARING.

1,396,225.  Specification of Letters Patent.  Patented Nov. 8, 1921.

Application filed October 25, 1917. Serial No. 198,519.

*To all whom it may concern:*

Be it known that we, CHARLES H. LOGUE and DONALD D. ORMSBY, citizens of the United States of America, and residents of Syracuse, in the county of Onondaga, in the State of New York, have invented new and useful Improvements in Differential Gearing, of which the following, taken in connection with the accompanying drawings, is a full, clear, and exact description.

This invention relates to certain improvements in differential gear as applied more particularly to the driving connections between the engine and axle sections of the traction wheels of motor-driven vehicles to compensate for the difference in travel of such wheels in turning corners, and at the same time prevents the slipping of either traction wheel when the traction resistance is unequal, as for example when either wheel is upon a soft or slippery surface while the other is upon a more solid foundation.

The broad object, therefore, is to provide simple and efficient means for automatically retarding the relatively free rotation of the wheel under least resistance so that the power required to drive the slipping wheel will be transmitted to the traction wheel under greatest resistance, thereby greatly reducing the liability of stalling the machine by the slipping of either wheel.

We have found by repeated demonstrations that this result may be successfully accomplished without in any way interfering with the differential speed of movement of the wheels in turning corners by constructing the teeth of the planetary and driven gears in such manner that the slipping wheel will produce an end or radial thrust of the planetary gear into frictional contact with a portion of the revoluble carrier for the planetary gear, thereby retarding the rolling motion of the planetary gear around the driven gear of the wheel under greatest traction resistance and incidentally retarding the relative rotation of the slipping wheel which, of course, would throw the entire power of the motor upon the wheel under greatest traction resistance to propel the machine.

The main object of our present invention is to render this frictional or braking resistance to rotation of the planetary wheel more instantaneous, positive and reliable in its retarding effect upon the free rotation of the wheel of least traction resistance, both in the forward and reverse drive of the machine.

Another object is to utilize the leverage strains upon the planetary gear or gears to increase said frictional or braking resistance, and at the same time to reduce the liability of breakage or impairment of any of the operating parts due to such strains.

Other objects and uses relating to specific structural features of the device as a whole will be brought out in the following description.

In the drawings—

Figure 1 is a horizontal sectional view of one form of our improved differential gear and portion of the engine shaft with the driving pinion thereon, the axle sections for the traction wheels being omitted.

Fig. 2 is an end view, partly in section, of the differential gearing shown in Fig. 1, omitting the driving pinion and large gear meshing therewith.

Fig. 3 is a perspective view of one of the adjustable bearings for the outer end of a planetary gear.

Fig. 4 is a perspective view of one of the bearings for the inner end of a planetary gearing.

Fig. 5 is a perspective view of the rotary yoke or carrier for the planetary gears and their bearings, and also for the large driving gear shown in Figs. 1 and 2.

Fig. 6 is a sectional view similar to Fig. 1 of a worm-driven central web for the planetary gears showing a modified form of lock for the adjustable outer end bearings of said planetary gears, and taken in the plane of line 6—6, Fig. 7.

Fig. 7 is an end view, partly in section, similar to Fig. 2, of the modified construction shown in Fig. 6.

Fig. 8 is a longitudinal sectional view of a further modified construction of differential gearing taken in the plane of line 8—8, Fig. 9.

Fig. 9 is an end view, partly in section, of the construction shown in Fig. 8.

The construction shown in Figs. 1 to 5, inclusive, comprises a pair of oppositely disposed coaxial gears —1— having similar hubs —2— extending in opposite directions from their main bodies and provided with central shaft bearings —3— which are corrugated circumferentially for sliding interlocking connection with similarly corrugated ends of a pair of coaxially axle sections, not shown, but by which rotary motion is transmitted from the gears —1— to the traction wheels of a motor vehicle.

The inner ends of the hubs —2— of the gears —1— are journaled in a central bore —4— of a web —5— which is located between the adjacent gear faces of the gears —1— and forms an integral part of a circular frame or yoke —6— surrounding said gears, as shown more clearly in Fig. 1.

The web —5— is provided with a series of, in this instance four, transverse openings —7— arranged equally distant apart circumferentially for receiving a corresponding number of planetary gears or pinions —8— which mesh with the gears —1— in a manner hereinafter described.

The portions of the web —5— at the inner and outer ends of each of the several openings —7— are provided with coaxial radial openings —9— and —10—, Figs. 1 and 2, for receiving hardened bushings or bearings —11— and —12—, respectively, the outer openings —10— and their corresponding bushings —12— being of considerably greater diameter than the inner openings —9— and bushings —11—.

The inner bushings —11— are provided with flanged outer ends engaging the inner walls of their respective openings —7— and are held against rotation by locking pins —13—, Fig. 2, said inner bushings being also provided with inwardly tapered journal bearings —14— for receiving similarly tapered hubs —15— on the inner ends of the planetary gears —8—.

The openings —10— are threaded internally for receiving the externally threaded bushings —12— which are adjustable axially by rotation, each bushing being held in its adjusted position by a key —16— and a clamping screw —17—, Fig. 1.

Each bushing —12— is provided with an outwardly tapered journal bearing —18— for receiving a similarly tapered hub —19— on the outer end of the corresponding planetary gear —8—, but of considerably larger diameter than the similarly tapered hub —15— at the inner end, the purposes of which will be hereinafter more fully described.

The object of the axial adjustment of the bushing —12— is to facilitate assembling and to take up wear, and in order that the outer bushings —12— may be locked in any position of adjustment sufficient to produce the desired fit between the cone hubs and their respective bearings, it is provided with a series of, in this instance six, peripheral grooves —20— spaced equal distances apart circumferentially, while one side of the wall of each opening —10— is provided with a plurality of, in this instance two, lengthwise grooves —21— spaced circumferentially a distance apart equal to substantially half of the distance between the grooves —20— so that in order to insert the key —16— it is never necessary to adjust the bushing —12— rotarily more than half the distance between the grooves —20— to bring one of the grooves —20— into registration with the key, for the reason that the key —16— may be inserted in either one of the grooves —21— and held in place by its clamping bolt —17—.

It is evident, however, that other devices may be employed for locking the bushings —12— in their adjusted positions, such for example as angular keys —16'—, Figs. 6 and 7, which are secured by screws —17'—to the periphery and end edges of the supporting frame or web for the planetary gears and have portions thereof engaged in recesses or key seats —21'— in the outer end faces of said bushings —12—.

Or, as shown in Figs. 8 and 9, the inner and outer bushings may be, respectively, held against rotation by tangential keys —13'— and —22—, the latter serving also as clamping bolts for securing the end heads of the rotary gear case to the central web or supporting frame for the planetary gears.

The outer ends of the hubs of the gears —1— are journaled in central openings in the adjacent ends of oppositely disposed coaxial end heads or collars —22— which are rigidly clamped to opposite ends of the central frame —6— by bolts —23— so as to abut against the outer end faces of the gears —1— to form end thrust bearings therefor and thereby hold the gears in positive mesh with opposite faces of the planetary gears —8—, the central frame —6— with its web —5— together with the end heads —22— constituting what may be termed a rotary gear case or housing for the gears.

The outer ends of the end heads —22— are reduced in diameter and elongated axially to form hubs which may be journaled within the usual stationary axle sections, not shown, surrounding the rotary shaft sections of the traction wheels, it being understood that the axle sections for the traction wheels and gears —1— which are locked thereto are rotatable relatively to each other and to the gear case, of which the end heads —22— form a part.

The revoluble supporting frame for the planetary gears shown in Figs. 1 to 5, inclusive, and 8 and 9 is provided with means for receiving and supporting a bevel gear ring —24—, Fig. 1, which is secured to one end of said frame by clamping bolts —25— and meshes with a corresponding driving pinion —26— on the adjacent end of an engine-driven shaft —27—, Fig. 1, whereby rotary motion is imparted to the circular frame —6— which in turn carries the planetary gears —8— bodily around the axis of said frame to rotate the gears —1— and axle sections, not shown, connected thereto for driving the traction wheels, while at the same time the gears —1— and corresponding axle sections of the traction wheels are free to rotate relatively to each other in the usual manner for differential gears to compensate for the differential speeds of the wheels in turning corners.

In some instances, however, we may employ a worm gear drive, in which case a worm gear ring —24'— would be secured by clamping bolts —25'— to and between the end heads —22—, as shown in Figs. 6 and 7.

One of the serious difficulties in the use of the ordinary differential gear is the unequal tractional resistance of the driving wheels, due to slipping of one or the other of the wheels, and as previously intimated the main object of our present invention is to utilize this tendency of either wheel to rotate relatively to the other wheel in preventing such relative rotation, and at the same time transmitting the traction power to the wheel having the greatest tractional resistance, whereby in most instances the possibility of stalling the machine may be overcome by applying the full power to the gripping wheel, in both the forward and reverse propulsion of the machine.

For this purpose the teeth of the intermeshing gears —1— and —8— are constructed in such manner that the slipping of either wheel will produce a wedging action between the teeth of the intermeshing gears for imparting a slight radial end thrust movement of the planetary gears —8— in one direction or the other according to the direction of rotation of the wheels, which end thrust action is utilized to produce wedging coaction between the planetary gears and their support or rather between the conical ends of said planetary gears and their corresponding bearings for counteracting the tendency of the planetary gears to roll around the gear corresponding to the traction wheel having the greatest resistance actuated by that having the least resistance.

That is, this radial or end thrust wedging action of the planetary gears in their respective bearings acts as a brake to prevent said rolling motion of the planetary gears, thereby establishing a locking effect between the two gears —1— so that the power applied to the rotary support for the planetary gears is transmitted through the latter to both of the gears —1— and to the traction wheel under greatest resistance which serves in most instances to prevent stalling of the machine by propelling the same forward or backward as the case may be, it being understood that the wedging coaction between the intermeshing gears is reversed as the direction of rotation of the wheels is reversed.

The wedging action between the cone hubs at the outer ends of the planetary gears and their respective bearings is utilized in the forward drive of the machine, and inasmuch as that is the direction in which the machine is driven mostly, these bearings are made larger than the inner bearings where the wedging action is utilized to prevent slipping of either wheel in reverse drive.

We have found that the spiral form of teeth is most effective in producing the desired wedging action between the intermeshing gears and consequent end thrust movement of the planetary gears in case either wheel should slip and we have, therefore, shown the teeth of all of the gears as of spiral form so that the main feature of the present application, lies in the wedging coaction between the planetary gears and their supporting frame during either the forward or reverse drive of the machine and, incidentally in the central web or frame which supports the planetary gears, in such manner as to effectively resist the end thrust and leverage strains exerted upon the planetary gears.

Another important feature of the invention, however, lies in the relatively sharp taper of the cone bearings on the ends of the planetary gears which not only affords a relatively large braking area, but also produces a quick and highly effective wedging action, and also permits the planetary gears to automatically free themselves from such wedging action to allow said planetary gears to compensate for the differential speeds of the traction wheels in turning corners, all of which features are essential in producing the necessary differential action, and at the same time automatically locking the gears —1— against relative rotation in case the tractional resistance of the driving wheels should be unequal.

What we claim is:

1. In a differential gearing, the combination of a rotary support having radially coaxial conical bearings in spaced relation radially, a pinion having opposite conical ends engaged in said bearings, and gears meshing with opposite sides of the pinion, said gears and pinion having coöperative means for producing end thrust of the pinion when operated under unequal resistance.

2. In a differential gearing, the combination of a pair of coaxial gears, a rotary support having a central web extending radially between the gears and provided with conical bearings in spaced relation, a pinion meshing with said gears and having opposite conical ends journaled in said bearings and meshing with said gears.

3. In a differential gear, the combination of a pair of coaxial relatively rotatable gears, a rotary support having a web extending radially between said gears and provided with radial conical bearings in spaced relation radially, and a pinion meshing with said gears and having opposite conical ends journaled in said bearings, said gears and pinion having their teeth inclined to their paths of rotation.

In witness whereof we have hereunto set our hands this 20th day of October, 1917.

CHARLES H. LOGUE.
DONALD D. ORMSBY.

Witnesses:
H. E. CHACE,
ALICE M. CANNON.